United States Patent
Negi et al.

(10) Patent No.: US 11,345,788 B2
(45) Date of Patent: May 31, 2022

(54) POROUS SHEET, AND POROUS COMPOSITE

(71) Applicant: KURARAY PLASTICS CO., LTD., Osaka (JP)

(72) Inventors: Taichi Negi, Osaka (JP); Takehiro Miyamoto, Fuwa-gun (JP); Teruo Kitamura, Osaka (JP)

(73) Assignee: KURARAY PLASTICS CO., LTD., Osaka (JP)

( * ) Notice: Subject to any disclaimer, the term of this patent is extended or adjusted under 35 U.S.C. 154(b) by 10 days.

(21) Appl. No.: 16/481,381

(22) PCT Filed: Jan. 29, 2018

(86) PCT No.: PCT/JP2018/002792
§ 371 (c)(1),
(2) Date: Jul. 26, 2019

(87) PCT Pub. No.: WO2018/139655
PCT Pub. Date: Aug. 2, 2018

(65) Prior Publication Data
US 2019/0390024 A1    Dec. 26, 2019

(30) Foreign Application Priority Data
Jan. 30, 2017   (JP) .............................. JP2017-014577

(51) Int. Cl.
*B32B 3/24*       (2006.01)
*C08J 5/18*       (2006.01)
(Continued)

(52) U.S. Cl.
CPC ................. *C08J 5/18* (2013.01); *B32B 27/08* (2013.01); *B32B 27/12* (2013.01); *B32B 27/32* (2013.01);
(Continued)

(58) Field of Classification Search
CPC ...................................................... B32B 3/266
See application file for complete search history.

(56) References Cited

U.S. PATENT DOCUMENTS

| | | | |
|---|---|---|---|
| 5,445,862 A | 8/1995 | Kaneko et al. | |
| 5,804,021 A | 9/1998 | Abuto et al. | |
| 7,855,316 B2 * | 12/2010 | Meyer | A61F 13/49012 604/383 |
| 2003/0124306 A1 | 7/2003 | Morman | |

(Continued)

FOREIGN PATENT DOCUMENTS

| | | |
|---|---|---|
| JP | 7-228719 A | 8/1995 |
| JP | 9-512504 A | 12/1997 |

(Continued)

OTHER PUBLICATIONS

Extended European Search Report dated Jul. 28, 2020 in European Patent Application No. 18744274.4, 6 pages.

(Continued)

*Primary Examiner* — William P Watkins, III
(74) *Attorney, Agent, or Firm* — Oblon, McClelland, Maier & Neustadt, L.L.P.

(57) ABSTRACT

An object of the present invention is to provide a porous sheet capable of satisfy both the properties of fitting, preventing tightening, and providing comfort immediately after wearing or at a standstill/at rest and the properties of tightening, fixation stability, and providing comfort during exercise such as sports at the same time, as well as a porous composite comprising the porous sheet, or particularly, a porous sheet and a porous composite for clothing, health products, medical supplies, and sporting goods. The present invention relates to a porous sheet made of a thermoplastic elastomer composition (A), having a plurality of slits and/or pores, and having a porosity of 5 to 50%, an anisotropy of 10% or more, and a stretching stress relaxation rate of 40% or less after being stretched by 500% and held for 60 seconds.

17 Claims, 3 Drawing Sheets

(51) Int. Cl.
    *B32B 27/08* (2006.01)
    *B32B 27/12* (2006.01)
    *B32B 27/32* (2006.01)
(52) U.S. Cl.
    CPC ... *B32B 2305/026* (2013.01); *B32B 2307/724* (2013.01)

(56) References Cited

U.S. PATENT DOCUMENTS

| | | | |
|---|---|---|---|
| 2004/0122404 A1 | 6/2004 | Meyer et al. | |
| 2007/0155900 A1 | 7/2007 | Chang et al. | |
| 2011/0059291 A1 | 3/2011 | Boyce et al. | |
| 2013/0324656 A1* | 12/2013 | Jogo | C08F 293/00 524/505 |

FOREIGN PATENT DOCUMENTS

| | | |
|---|---|---|
| JP | 11-291372 A | 10/1999 |
| JP | 2001-30394 A | 2/2001 |
| JP | 2002-105278 A | 4/2002 |
| JP | 2006-511375 A | 4/2006 |
| JP | 5055054 B2 | 10/2012 |
| WO | WO 95/29810 A1 | 11/1995 |
| WO | WO 2004/060666 A1 | 7/2004 |
| WO | WO 2016/073686 A1 | 5/2016 |

OTHER PUBLICATIONS

International Search Report dated May 1, 2018 in PCT/JP2018/002792 filed Jan. 29, 2018.
English translation of the International Preliminary Report on Patentability (chapter 1) and Written Opinion, dated Aug. 8, 2019, in PCT/JP2018/002792, 9 pages.
Combined Chinese Office Action and Search Report dated Jul. 2, 2021 in corresponding Chinese Patent Application No. 201880008992.9 (with English Translation and English Translation of Category of Cited Documents), 15 pages.

* cited by examiner

[Fig. 1]
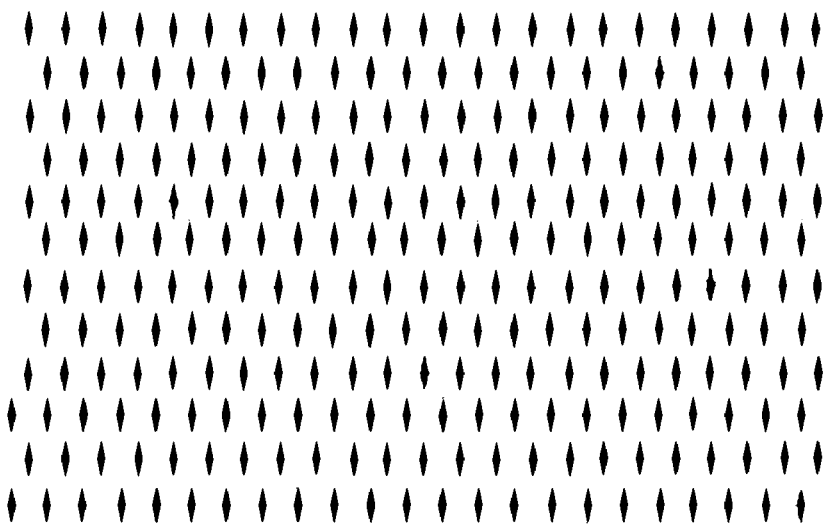
[Fig. 2]
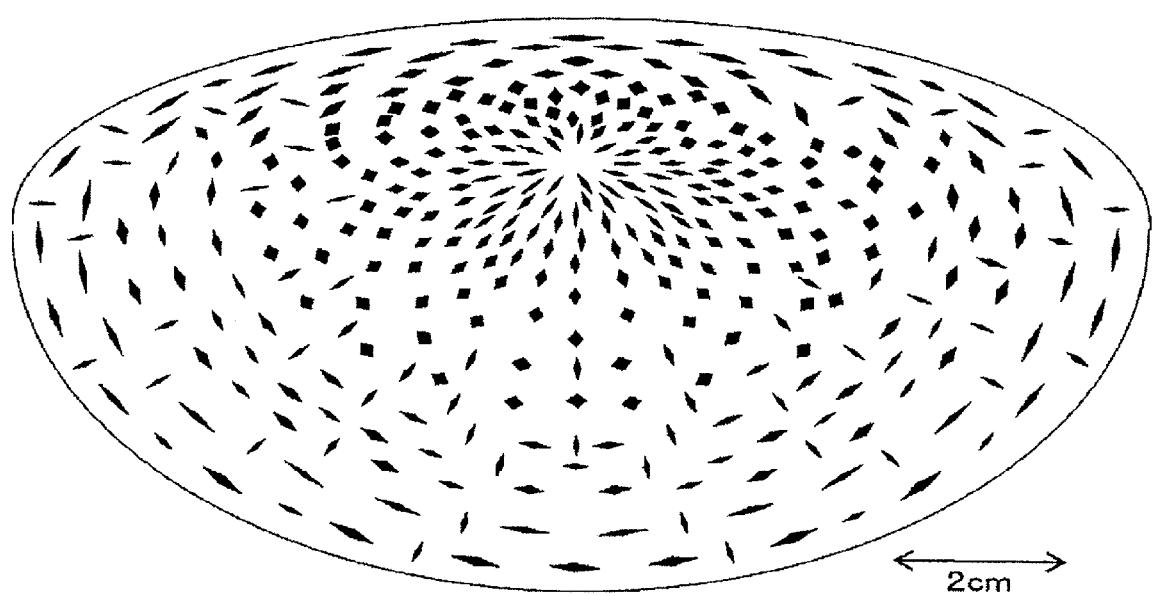

[Fig. 3]
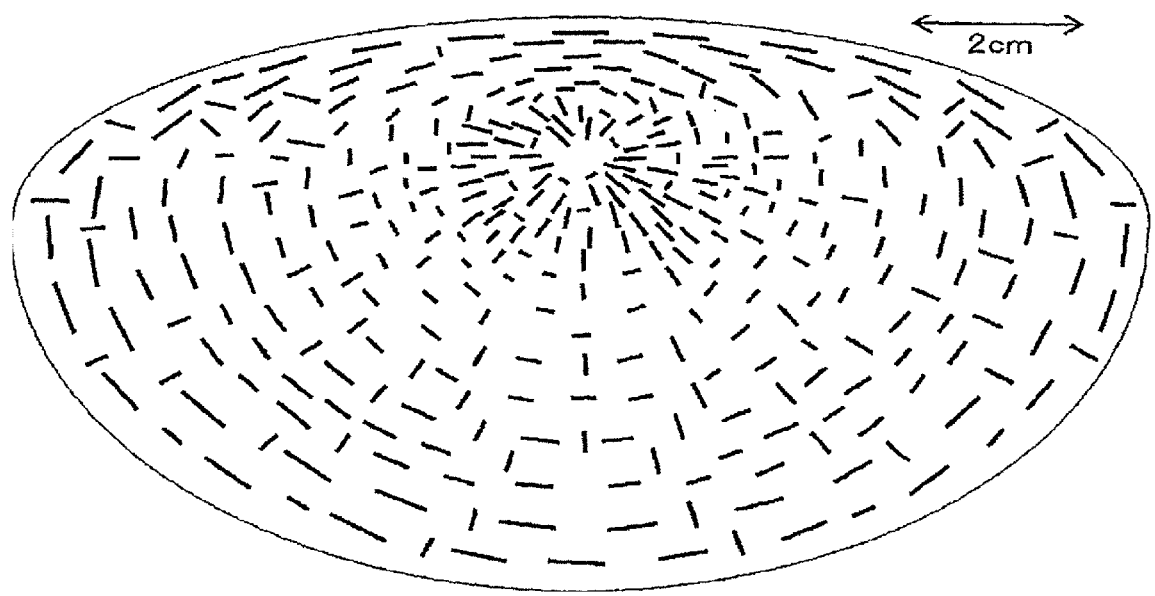
[Fig. 4]
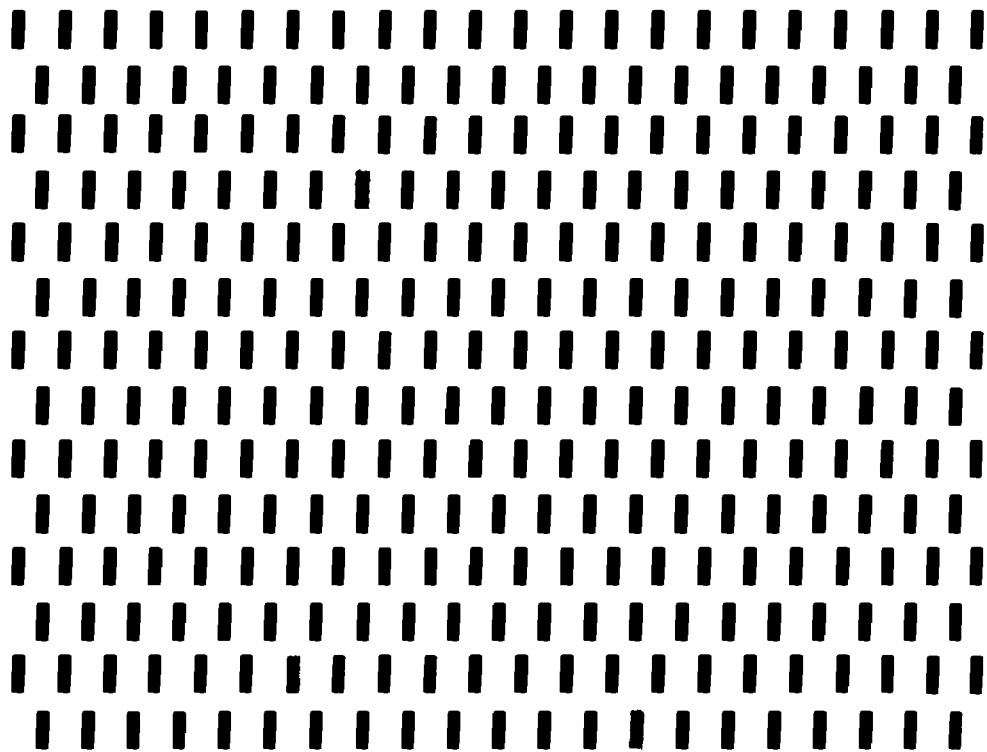

[Fig. 5]
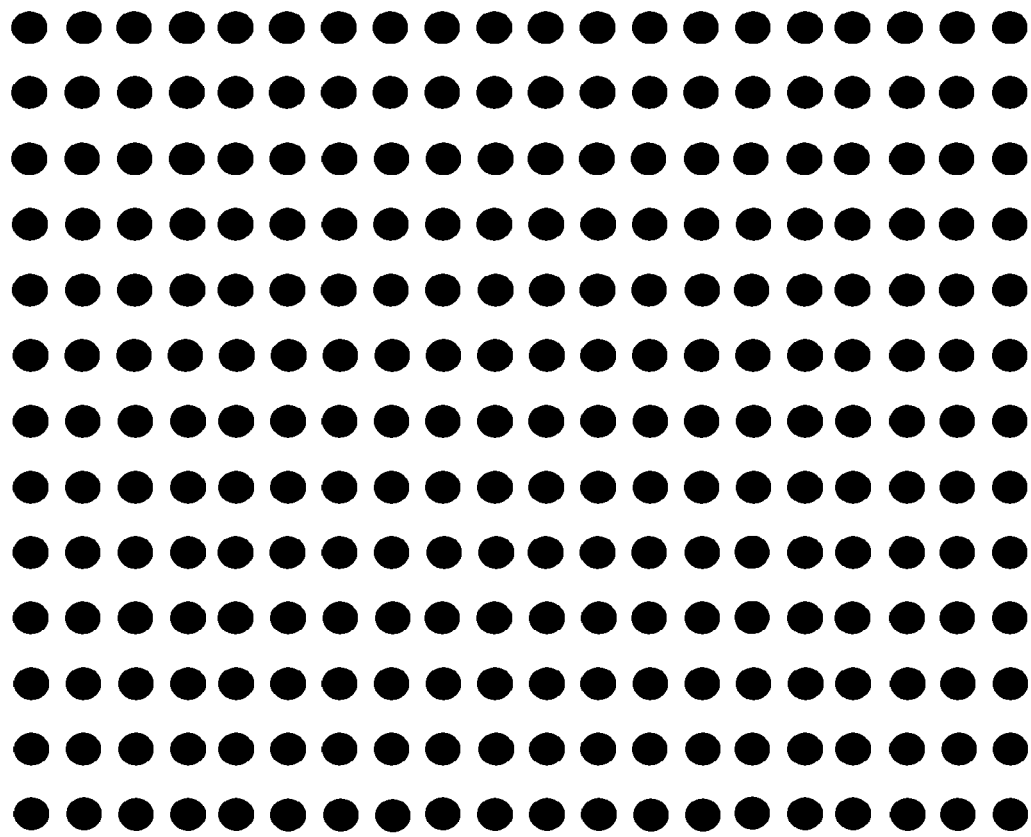

POROUS SHEET, AND POROUS COMPOSITE

TECHNICAL FIELD

This patent application claims priority under the Paris Convention based on Japanese Patent Application No. 2017-014577 (filed Jan. 30, 2017), which is incorporated herein by reference in its entirety.

The present invention relates to a porous sheet capable of exhibiting favorable properties of fitting, preventing tightening, and providing comfort (preventing stuffiness) for the body immediately after wearing or at a standstill/at rest, and at the same time, capable of exhibiting properties of fixation stability, tightening, and providing comfort (preventing stuffiness) during exercise, as well as a porous composite comprising the porous sheet and a base fabric.

BACKGROUND ART

Composites formed by combining a base fabric with a resin having rubber elasticity are used in various applications such as clothing, health products, medical supplies, and sporting goods. Patent Documents 1 and 2 disclose, as a composite formed by laminating a resin having rubber elasticity on a base fabric, a laminated structure or a stretchable nonwoven fabric formed by laminating a base fabric with a styrene elastomer having rubber elasticity.

Furthermore, Patent Document 3 discloses a porous film in which a resin composition comprising an ethylene-α-olefin polymer, a thermoplastic elastomer, and an inorganic filler is extended and thereby oriented to form pores through interfacial peeling from the resin component.

PRIOR ART DOCUMENTS

Patent Documents

Patent Document 1: Japanese Laid-Open Patent Publication No. 2002-105278
Patent Document 2: Japanese Patent No. 5055054
Patent Document 3: Japanese Laid-Open Patent Publication No. 7-228719

SUMMARY OF THE INVENTION

Problem to be Solved by the Invention

For materials for various applications such as clothing, health products, medical supplies, and sporting goods, properties of tightening and fixation stability for the body during exercise are important from the viewpoint of the ease of movement of a wearer. However, if emphasis is placed only on the properties of tightening and fixation stability for the body during exercise such as sports, the body is excessively tightened at a standstill/at rest, which may cause internal bleeding or discoloration due to inhibition of blood flow, a remaining mark or discoloration due to biting into the body, and eruption or rashes due to stuffiness such as poor air permeability, so that a wearer may feel discomfort during wearing, and therefore, a property of preventing tightening becomes a problem. Additionally, a property of fitting is also important at a standstill/at rest.

On the other hand, if emphasis is placed only on the properties of fitting, preventing tightening, and providing comfort (preventing stuffiness) immediately after wearing or at a standstill/at rest, the properties of tightening and fixation stability required during exercise are not implemented, and the movement of the wearer may be impaired. It is also required to suppress discomfort due to occurrence of stuffiness during exercise such as sports. Therefore, it is required to satisfy both the properties of fitting, preventing tightening, and providing comfort immediately after wearing or at a standstill/at rest, and the properties of tightening, fixation stability, and providing comfort during exercise.

The laminated structure described in Patent Document 1 has almost no air permeability and therefore has room for improvement in the property of providing comfort, and if the laminated structure is used for clothing, health products, medical supplies, and sports goods, biting into the body may become conspicuous.

Although the stretchable nonwoven fabric described in Patent Document 2 has good air permeability, a low elastic recovery force in a region with high tensile elongation prevents implementation of the properties of tightening and fixation stability during exercise.

Although the porous film described in Patent Document 3 is excellent in flexibility and stretchability, nonuniform shape and size of pores lead to poor balance of the properties of fitting, preventing tightening, and providing comfort immediately after wearing or at a standstill/at rest, and the properties of tightening, fixation stability, and providing comfort during exercise. Furthermore, although the porous film described in the same document is also excellent in moisture permeability, the moisture permeability is at most about 4200 g/m$^2$·24 hr as is apparent from the examples, and the moisture permeability of this level may allow stuffiness to occur during exercise and cause discomfort.

Therefore, an object of the present invention is to provide a porous sheet capable of satisfy both the properties of fitting, preventing tightening, and providing comfort immediately after wearing or at a standstill/at rest and the properties of tightening, fixation stability, and providing comfort during exercise such as sports at the same time, as well as a porous composite comprising the porous sheet, or particularly, a porous sheet and a porous composite for clothing, health products, medical supplies, and sporting goods.

Means for Solving Problem

As a result of intensive studies for solving the problem, the present inventors completed the present invention.

Specifically, the present invention provides the following preferred aspects.

[1] A porous sheet made of a thermoplastic elastomer composition (A), having a plurality of slits and/or pores, and having a porosity of 5 to 80%, an anisotropy of 10% or more, and a stretching stress relaxation rate of 40% or less after being stretched by 500% and held for 60 seconds.

[2] The porous sheet according to [1], wherein the thermoplastic elastomer composition (A) comprises (a) at least one block copolymer, and/or a hydrogenated product of the block copolymer, made up of a polymer block (X) composed of at least one vinyl aromatic compound and a polymer block (Y) composed of at least one conjugated diene compound.

[3] The porous sheet according to [2], wherein a proportion of a fraction having a weight average molecular weight not more than 200,000 is 50 to 100 mass % based on the whole of the block copolymer (a).

[4] The porous sheet according to [2] or [3], wherein the thermoplastic elastomer composition (A) comprises 10 to 400 parts by mass of a hydrocarbon softener (b) relative to 100 parts by mass of the block copolymer (a).

[5] The porous sheet according to any one of [1] to [4], wherein the porosity is 5 to 50%.

[6] The porous sheet according to any one of [1] to [5], wherein the pores are sized to 0.5 to 100 mm².

[7] The porous sheet according to any one of [1] to [6], wherein a content of an organic or inorganic additive is 0 to 40 mass % relative to the thermoplastic elastomer composition (A).

[8] The porous sheet according to any one of [4] to [7], wherein the thermoplastic elastomer composition (A) comprises 2 to 10 parts by mass of an olefin resin relative to 100 parts by mass of the block copolymer (a).

[9] The porous sheet according to any one of [1] to [8], wherein the porous sheet has a mesh shape.

[10] A porous composite, comprising: a base fabric (B), and the porous sheet according to any one of [1] to [9] disposed on the base fabric (B).

Effect of the Invention

The present invention enables provision of the porous sheet capable of satisfying both the properties of fitting, preventing tightening, and providing comfort immediately after wearing or at a standstill/at rest and the properties of tightening, fixation stability, and providing comfort during exercise such as sports at the same time, as well as the porous composite comprising the porous sheet, or particularly, the porous sheet and the porous composite for clothing, health products, medical supplies, and sporting goods.

BRIEF DESCRIPTION OF DRAWINGS

FIG. 1 is a diagram showing a pore shape (minute rhombuses) of a porous sheet (mesh shape) in Example 1.

FIG. 2 is a diagram showing a pore shape of a porous sheet in Example 4.

FIG. 3 is a diagram showing a slit shape of a porous sheet in Example 5.

FIG. 4 is a diagram showing a slit shape of a porous sheet in Example 12.

FIG. 5 is a diagram showing a pore shape of a porous sheet in Example 13.

MODES FOR CARRYING OUT THE INVENTION

<Porous Sheet>

An embodiment of the present invention provides a porous sheet made of a thermoplastic elastomer composition (A), having a plurality of slits and/or pores, and having a porosity of 5 to 50%, an anisotropy of 10% or more, and a stretching stress relaxation rate of 40% or less after being stretched by 500% and held for 60 seconds. In the present invention, slits mean gaps having different longitudinal and lateral lengths while pores mean pores having various shapes described later; however, the pores are a concept containing slits, and the slits form the pores. In the present invention, "a plurality of slits and/or pores" means two or more slits and/or pores.

The porosity of the porous sheet is 5 to 80%, preferably 5 to 70%, more preferably 5 to 60%, further preferably 5 to 50%, yet further preferably 8 to 48%, particularly preferably 10 to 45%, most preferably 20 to 40%. The porosity of the porous sheet lower than the lower limit (e.g., less than 5%) results in an insufficient property of providing comfort immediately after wearing or at a standstill and at rest such as during walking as well as during exercise, and the porosity exceeding the upper limit (e.g., 80%) makes the sheet easy to damage at the time of stretching, which may cause problems in the properties of fixation stability, tightening, etc. during exercise. The porosity of the porous sheet not less than the lower limit can reduce stuffiness/rashes due to close contact of the sheet with the body, increases the air permeability, and therefore improves the property of providing comfort immediately after wearing or at a standstill and at rest such as during walking as well as during exercise. The porosity of the porous sheet not more than the upper limit tends to make the strength of the porous sheet high, can suppress the breakage at the time of stretching, and can improve the properties of fixation stability and tightening during exercise.

In the present invention, the porosity refers to a proportion of the area of the slits and/or pores based on the sum of the area of the porous sheet and the area of the slits and/or pores in a state of being stretched by 10% in each of both directions $D_{max}$ and $D_{min}$ when the direction $D_{max}$ is defined as a direction in which the stretching stress of the porous sheet at the elongation of 10% is maximized among all the directions of the porous sheet and the direction $D_{min}$ is defined as a direction perpendicular to the direction $D_{max}$. Specifically, the porosity can be determined by a method described in examples.

The anisotropy of the porous sheet is 10% or more, preferably 15% or more, more preferably 18% or more, further preferably 20% or more. The anisotropy of the porous sheet less than 10% prevents the sheet from exhibiting the stretchability in accordance with a body part and exercise contents and particularly causes a problem of deterioration in the properties of tightening and fixation stability during exercise, and the problem tends to be obvious in long-term use. The anisotropy of the porous sheet not less than the lower limit allows the sheet to exhibit the stretchability in accordance with a body part and exercise contents. The anisotropy of the porous sheet is usually 100% or less.

In the present invention, the anisotropy can be determined in accordance with the following equation:

Anisotropy (%)=[($S_{Dmax100\%}$−$S_{Dmin100\%}$)/$S_{Dmax100\%}$]×100 where $S_{Dmax100\%}$ is the stretching stress of the porous sheet at the elongation of 100% in the direction $D_{max}$ and $S_{Dmin100\%}$ is the stretching stress of the porous sheet at the elongation of 100% in the direction $D_{min}$ when the direction $D_{max}$ is defined as a direction in which the stretching stress at the elongation of 100% is maximized among all the directions of the porous sheet and the direction $D_{min}$ is defined as a direction perpendicular to the direction $D_{max}$. When the anisotropy is measured, the stretching stress at the elongation of 100% is measured since the anisotropy between the direction $D_{max}$ and the direction $D_{min}$ clearly emerges at the elongation of 100%. Specifically, the anisotropy can be determined by a method described in the examples.

The anisotropy in the porous sheet, especially, the mesh-shaped porous sheet, can be controlled by adjusting an opening shape (area, aspect ratio, etc.), an opening direction, an opening density, etc. of the pores as described later. Specifically, for example, the anisotropy can be controlled by adjusting an opening shape (controlled such that the longitudinal and lateral lengths of pores are made different), an opening density (controlled such that distances between pores are made different in longitudinal and lateral directions of the pores), and extension conditions at the time of manufacturing of the porous sheet (controlled such that longitudinal and lateral extension ratios and extension temperatures are made different). A plurality of pores of the porous sheet, especially, the mesh-shaped porous sheet, may have the same shape or different shapes. For example, if a plurality of fine slits are opened in a staggered manner in the porous sheet, especially, the mesh-shaped porous sheet, a stretching stress in a direction perpendicular to the slits can significantly be reduced while a high stretching stress is maintained in a slit direction in a low elongation stage, so that the anisotropy can be imparted to the porous sheet.

The stretching stress relaxation rate of the porous sheet is 40% or less, preferably 38% or less, more preferably 35% or less. The stretching stress relaxation rate of the porous sheet exceeding 40% can cause a problem of deterioration in the properties of tightening and fixation stability during exercise, and the problem tends to be obvious in long-term use. The stretching stress relaxation rate of the porous sheet not more than the upper limit makes the properties of tightening and fixation stability during exercise favorable. The stretching stress relaxation rate of the porous sheet is usually 5% or more.

In the present invention, the stretching stress relaxation rate can be represented by the following equation by using a stretching stress ($S_{Dmax500\%\cdot0\ seconds}$) immediately after being stretched at the elongation of 500% in the direction $D_{max}$ and a stretching stress ($S_{Dmax500\%\cdot60\ seconds}$) after being held for 60 seconds at the elongation of 500% when the direction $D_{max}$ is defined as a direction in which the stretching stress of the porous sheet at the elongation of 500% is maximized among all the directions of the porous sheet and the direction $D_{min}$ is defined as a direction perpendicular to the direction $D_{max}$:

Stretching stress relaxation rate (%)=
[($S_{Dmax500\%\cdot0\ seconds}$−$S_{Dmax500\%\cdot60\ seconds}$)/
$S_{Dmax500\%\cdot0\ seconds}$]×100.

The anisotropy and the stretching stress relaxation rate of the porous sheet can be controlled by adjusting the opening shape (area, aspect ratio, etc.), the opening direction, the thickness of the porous sheet, and/or the opening density of the slits and/or pores, the extension conditions at the time of manufacturing of the porous sheet (extension conditions such as longitudinal and lateral extension ratios different from one another and temperatures), etc. The plurality of slits and/or pores of the porous sheet may have the same shape or different shapes. For example, if a plurality of fine slits are opened in a staggered manner in the porous sheet, a stretching stress in a direction perpendicular to the slits can significantly be reduced although the stretching stress is high in the slit direction in the low elongation stage.

A possible shape of the slits of the porous sheet is a linear shape. A possible shape of the pores of the porous sheet is not particularly limited as long as the porosity, the anisotropy and the stretching stress relaxation rate described above can be achieved. Examples of the shape of the pores comprise circle, ellipse, triangle, quadrangle, polygon, square, rectangle, trapezoid, rhombus, etc. The porous sheet preferably has pores having shapes of circle, ellipse, triangle, quadrangle, polygon, square, rectangle, trapezoid, rhombus, etc. from the viewpoint of the object of the present invention. The porous sheet may have pores having shapes obtained by combining slits and pores. The porosity, the anisotropy, and the stretching stress relaxation rate can be adjusted by changing a length of a side of the shape of each of the slits and/or pores.

Among the shapes of the slits and/or pores as described above, the shape shown in FIG. 1 (black portions in the figure indicate slits or pores) is generally referred to as a mesh shape. Examples of the mesh-shaped porous sheet comprise a perforated sheet, a perforated net body, a perforated knitted body, etc. obtained by forming pores in the sheet by a method such as punching. Examples of the sheet comprise sheet-shaped materials such as a film, a woven fabric, and a non-woven fabric. The mesh-shaped porous sheet is a porous sheet having a relatively large pore diameter as described in detail later, and a large number of pores are usually disposed to penetrate through the front and back of the sheet.

In the porous sheet, a method of arrangement of the slits and/or pores is not particularly limited as long as the porosity, the anisotropy, and the stretching stress relaxation rate are within predetermined ranges. For example, in the porous sheet, the slits and/or pores can be arranged in a staggered manner (e.g., staggered by 45°, staggered by 60°). By changing the pitches of the slits and/or pores in the direction $D_{max}$ and the direction $D_{min}$, the porosity, the anisotropy, and the stretching stress relaxation rate can also be adjusted.

Regarding the length and pitch (distance between end portions) of the slits, preferably, the length is 1 to 10 mm, and the pitch is 1 to 20 mm (preferably 1 to 10 mm). The length and pitch of the slits not less than the lower limit makes the property of tightening favorable, and the length and the pitch not more than the upper limit improves a property of retaining a shape of a body part. A ratio l/L of a longitudinal length (L) and a lateral length (l) is preferably 0.05 to 0.95. By satisfying these conditions, the property of tightening is made favorable, and the property of retaining a shape of a body part is improved. The pitch in the direction $D_{max}$ and the pitch in the direction $D_{min}$ may be the same or different.

The pores preferably have a length of 1 to 10 mm and a pitch of 1 to 20 mm. Although the pores having the same or different longitudinal and lateral lengths are usable, if the pores having the different longitudinal and lateral lengths are used, the ratio l/L of the longitudinal length (L) and the lateral length (l) is preferably 0.05 to 0.95 as with the slits. Satisfying these conditions can enhance the properties of fitting and preventing tightening immediately after wearing or at a standstill/at rest and can implement the properties of tightening and fixation stability during exercise. A pore spacing in the direction $D_{max}$ and a pore spacing in the direction $D_{min}$ may be the same or different.

Regarding the size of the slits or pores, the area of one slit or pore is preferably 0.5 to 100 mm², more preferably 1 to 70 mm². The pore spacing (spacing between end portions of the pores) is preferably 1 to 20 mm. The longest length of the pores is preferably 1 to 10 mm. The area of one pore and the pore spacing within the ranges provide excellent air permeability and, at the same time, can enhance the properties of fitting and preventing tightening immediately after wearing or at a standstill/at rest and also implement the properties of tightening and fixation stability during exercise.

By adjusting the size, especially, the length, the pitch, and the area, of the slits or pores in this way, the desired porosity, anisotropy, and stretching stress relaxation rate can be obtained.

The thickness of the porous sheet can be changed depending on the anisotropy and the stretching stress relaxation rate as well as an application and is preferably, for example, 10

μm to 5,000 μm, preferably 50 μm to 3,000 μm, more preferably 100 μm to 1,500 μm, further preferably 300 μm to 1,000 μm.

<Thermoplastic Elastomer Composition (A)>

The thermoplastic elastomer composition (A) constituting the porous sheet of an embodiment of the present invention contains a thermoplastic elastomer. Examples of the thermoplastic elastomer comprise a styrene elastomer, an olefin elastomer, a urethane elastomer, a polyester elastomer, a nitrile elastomer, an amide elastomer, a polybutadiene elastomer, an acrylic elastomer, a vinyl chloride thermoplastic elastomer, etc. Among them, the styrene elastomer, the olefin elastomer, the urethane elastomer, the polyester elastomer, the acrylic elastomer, and mixtures thereof are preferable.

<Block Copolymer (a)>

In a preferred embodiment of the present invention, the thermoplastic elastomer composition (A) contains (a) at least one block copolymer, and/or a hydrogenated product of the block copolymer, made up of a polymer block (X) composed of at least one vinyl aromatic compound and a polymer block (Y) composed of at least one conjugated diene compound.

Therefore, the thermoplastic elastomer contained in the thermoplastic elastomer composition is (a) at least one block copolymer, and/or a hydrogenated product of the block copolymer, made up of a polymer block (X) composed of at least one vinyl aromatic compound and a polymer block (Y) composed of at least one conjugated diene compound (hereinafter, the block copolymer and/or a hydrogenated product of the block copolymer are also collectively referred to as "block copolymer (a)"). Regarding the block copolymer (a), the block copolymer may at least partially be hydrogenated. The block copolymer (a) may be a mixture of the block copolymer and the hydrogenated product of the block copolymer.

The block copolymer (a) preferably contains one or more polymer blocks (X) and one or more polymer blocks (Y), from the viewpoints of the property of fitting immediately after wearing or at a standstill/at rest and the properties of fixation stability and tightening during exercise. The block copolymer (a) preferably contains two or more polymer blocks (X) and one or more polymer blocks (Y) made of a conjugated diene compound, from the viewpoints of the property of fitting immediately after wearing or at a standstill/at rest and the properties of fixation stability and tightening during exercise, heat resistance, and mechanical properties. A binding mode of the polymer block (X) and the polymer block (Y) may be linear, branched, or any combination thereof; when the polymer block (X) is denoted by X and the polymer block (Y) is denoted by Y, examples thereof can comprise a diblock structure represented by X—Y, a triblock structure represented by X—Y—X, and multiblock structures represented by $(XY)_n$ and $(XY)_n$-x (where n represents an integer of 2 or more); and among them, the triblock structure represented by X—Y—X is preferably from the viewpoints of the mechanical properties, antifouling properties, handleability, etc., while the diblock structure represented by X—Y is preferable from the viewpoints of the property of fitting immediately after wearing or at a standstill/at rest and the properties of fixation stability and tightening during exercise.

Examples of the vinyl aromatic compound comprise styrene, α-methylstyrene, β-methylstyrene, o-methylstyrene, m-methylstyrene, p-methylstyrene, t-butylstyrene, 2,4-dimethylstyrene, 2,4,6-trimethylstyrene, monofluorostyrene, difluorostyrene, monochlorostyrene, dichlorostyrene, methoxystyrene, vinyl naphthalene, vinyl anthracene, etc. Among them, the vinyl aromatic compound is preferably derived from styrene, more preferably styrene and α-methylstyrene. One of the vinyl aromatic compounds may be used alone, or two or more of the vinyl aromatic compounds may be used together.

The polymer block (X) may be made up of another copolymerizable monomer in addition to the vinyl aromatic compound. In this case, the content of structural units derived from the other copolymerizable monomer is preferably 30 mass % or less, more preferably 10 mass % or less, and usually 0 mass % or more, based on the mass of the polymer block (X).

Examples of the other copolymerizable monomer in the polymer block (X) comprise ion-polymerizable monomers such as 1-butene, pentene, hexene, 1,3-butadiene (also referred to simply as "butadiene"), isoprene, and methyl vinyl ether. These other copolymerizable monomers can be used alone or in combination of two or more. If the polymer block (X) has structural units derived from another copolymerizable monomer in addition to the vinyl aromatic compound, the binding form thereof may be any form such as random and tapered.

The content of the structural units derived from the vinyl aromatic compound in the block copolymer (a) is preferably 5 to 95 mass %, more preferably 5 to 75 mass %, and further preferably 5 to 50 mass %. The content of the structural units derived from the vinyl aromatic compound within the range makes the property of fitting immediately after wearing or at a standstill/at rest and the properties of fixation stability and tightening during exercise favorable.

Examples of the conjugated diene compound comprise butadiene, isoprene, 2,3-dimethyl-1,3-butadiene, 1,3-pentadiene, and 1,3-hexadiene. Among them, butadiene, isoprene, and mixtures thereof are preferred. One of the conjugated diene compounds may be used alone, or two or more of the conjugated diene compounds may be used together.

From the viewpoints of the property of fitting immediately after wearing or at a standstill/at rest and the properties of fixation stability and tightening during exercise, the polymer block (Y) is preferably composed of structural units derived from isoprene alone or from isoprene and butadiene. The polymer block (Y) may be made up of another copolymerizable monomer in addition to the conjugated diene compound. In this case, the content of structural units derived from the other copolymerizable monomer is preferably 30 mass % or less, more preferably 10 mass % or less, based on the mass of the polymer block (Y), and usually 0 mass % or more.

Examples of the other copolymerizable monomer in the polymer block (Y) comprise anion-polymerizable monomers of a vinyl aromatic compound etc. such as styrene, α-methylstyrene, o-methylstyrene, m-methylstyrene, p-methylstyrene, 1,3-dimethylstyrene, diphenylethylene, 1-vinylnaphthalene, 4-propylstyrene, 4-cyclohexylstyrene, 4-dodecylstyrene, 2-ethyl-4-benzyl styrene, 4-(phenylbutyl) styrene, etc. These other copolymerizable monomers can be used alone or in combination of two or more. If the polymer block (Y) has structural units derived from another copolymerizable monomer of a vinyl aromatic compound etc. in addition to the structural units derived from the conjugated diene compound, the binding form thereof may be any form such as random and tapered.

From the viewpoint of heat resistance and light resistance, the block copolymer (a) may at least partially be hydrogenated. The block copolymer (a) may be a mixture of a hydrogenated block copolymer and a non-hydrogenated block copolymer. In this case, preferably 50% or more, more preferably 75% or more, particularly preferably 95% or more, of the carbon-carbon double bonds derived from the conjugated diene compound is hydrogenated in the polymer block made of the conjugated diene compound. The hydrogenation rate is usually 100% or less. The hydrogenation rate can be measured by iodine value measurement, an infrared spectrophotometer (IR), a nuclear magnetic resonance method ($^1$H-NMR, $^{13}$C-NMR), etc.

The content of the structural units derived from the conjugated diene compound in the block copolymer (a) is preferably 5 to 95 mass %, more preferably 5 to 75 mass %, and further preferably 5 to 50 mass %. The content of the structural units derived from the conjugated diene compound within the range makes the property of fitting immediately after wearing or at a standstill/at rest and the property of tightening during exercise favorable.

The content of the polymer block (X) in the block copolymer (a) is preferably 5 to 90 mass %, more preferably 5 to 70 mass %, further preferably 15 to 50 mass %, based on the total mass of the block copolymer (a). The content of the structural units derived from the conjugated diene compound within the range makes the property of fitting immediately after wearing or at a standstill/at rest and the property of fixation stability during exercise favorable.

The content of the polymer block (Y) in the block copolymer (a) is preferably 30 to 90 mass %, more preferably 50 to 80 mass %, based on the total mass of the block copolymer (a). The content of the polymer block (Y) within this range makes the property of fitting immediately after wearing or at a standstill/at rest and the property of tightening during exercise favorable.

The weight average molecular weight of the block copolymer (a) is preferably in the range of 40,000 to 500,000, more preferably 50,000 to 450,000, further preferably 100,000 to 400,000. The weight average molecular weight of the block copolymer (a) not less than the lower limit value makes the mechanical properties of the thermoplastic elastomer composition (A) favorable. The weight average molecular weight of the block copolymer (a) not more than the upper limit value suppresses an increase in viscosity and makes the molding processability favorable.

In the block copolymer (a), the proportion of the fraction having a weight average molecular weight not more than 200,000 (hereinafter also referred to as "low polymerization degree ratio") is preferably 50 to 100 mass %, more preferably 60 to 100 mass %, further preferably 70 to 100 mass %, particularly preferably 80 to 100 mass %, based on the whole of the block copolymer (a). The low polymerization degree ratio of the block copolymer (a) within the range facilitates satisfying both the properties of fitting, preventing tightening, and providing comfort immediately after wearing or at a standstill/at rest and the properties of fixation stability, tightening, and providing comfort during exercise.

In the present invention, a weight average molecular weight Mw can be measured by using gel permeation chromatography and calculated in terms of polystyrene. Specifically, the weight average molecular weight Mw can be measured by a method described in the examples.

In the block copolymer (a), the content of 3,4-bond units and 1,2-bond units of structural units derived from isoprene and/or butadiene (hereinafter also referred to as "vinyl bond content") is preferably 3 to 90 mol %, more preferably 3 to 85 mol %, further preferably 5 to 80 mol %, based on all the structural units derived from isoprene and butadiene. The vinyl bond content of the block copolymer (a) within the range facilitates satisfying both the properties of fitting, preventing tightening, and providing comfort immediately after wearing or at a standstill/at rest and the properties of fixation stability, tightening, and providing comfort during exercise.

In a preferred embodiment of the present invention, from the viewpoints of satisfying both the properties of fitting, preventing tightening, and providing comfort immediately after wearing or at a standstill/at rest and the properties of fixation stability, tightening, and providing comfort during exercise, the block copolymer (a) is preferably a mixture of a block copolymer (a1) having the vinyl bond content not less than 45 mol % and a block copolymer (a2) having the vinyl bond content less than 45 mol % based on all the structural units derived from isoprene and butadiene. When the block copolymer (a) is a mixture of the block copolymer (a1) and the block copolymer (a2), the vinyl bond content of the block copolymer (a) is preferably 35 mol % or more.

When the block copolymer (a) is a mixture of the block copolymer (a1) and the block copolymer (a2), the vinyl bond content of the block copolymer (a1) is preferably 45 mol % or more, more preferably 50 mol % or more, further preferably 55 mol % or more, especially preferably 60 mol % or more, and particularly preferably 70 mol % or more. When the vinyl bond content of the block copolymer (a1) is not less than the lower limit, both the properties of fitting, preventing tightening, and providing comfort immediately after wearing or at a standstill/at rest and the properties of fixation stability, tightening, and providing comfort during exercise can be satisfied. The vinyl bond content of the block copolymer (a1) is usually 100 mol % or less.

The vinyl bond content of the block copolymer (a2) is preferably less than 45 mol %, more preferably 40 mol % or less, further preferably 35 mol % or less, yet further preferably 30 mol % or less, especially preferably 25 mol % or less, particularly preferably 20 mol % or loss, extremely preferably 15 mol % or less, still more preferably 10 mol % or less. When the vinyl bond content of the block copolymer (a1) is less than (or not more than) the upper limit, both the properties of fitting, preventing tightening, and providing comfort immediately after wearing or at a standstill/at rest and the properties of fixation stability, tightening, and providing comfort during exercise can be satisfied. The vinyl bond content of the block copolymer (a2) is usually 0 mol % or more.

When the block copolymer (a) is a mixture of the block copolymer (a1) and the block copolymer (a2), the vinyl bond content of the block copolymer (a) is preferably 35 mol % or more, more preferably 37 mol % or more, further preferably 40 mol % or more. When the vinyl bond content of the block copolymer (a) is not less than the lower limit, both the properties of fitting, preventing tightening, and providing comfort immediately after wearing or at a standstill/at rest and the properties of fixation stability, tightening, and providing comfort during exercise can be satisfied at the same time. The vinyl bond content of the block copolymer (a) is usually 100 mol % or less.

The vinyl bond content can be obtained from a measurement value determined by measuring the content of 3,4-bond units and 1,2-bond units of structural units derived from isoprene and/or butadiene by iodine value measurement, an infrared spectrophotometer (IR), a nuclear magnetic resonance method ($^1$H-NMR, $^{13}$C-NMR), etc. and can be obtained by, for example, a method described in the examples The block copolymer (a) is not particularly limited in terms of manufacturing thereof, and can be manufactured by, for example, the methods described in Japanese Patent No. 2703335 and Japanese Laid-Open Patent Publication No. 2003-128870. Typical commercial products of the block copolymer (a) comprise, for example, TAIPOL manufactured by TSRC Corporation and Septon manufactured by Kuraray Co., Ltd.

<Hydrocarbon Softener (b)>

In the present invention, the thermoplastic elastomer composition (A) usually contains a hydrocarbon softener (b), more specifically, a hydrocarbon rubber softener (b). Examples of the hydrocarbon rubber softener (b) (hereinafter, also referred to as "softener (b)") comprise process oils such as paraffinic oil, naphthenic oil, and aromatic oil; liquid paraffin; ethylene, conjugated diene compounds, and/or homopolymers and copolymers of α-olefins having the carbon number of 4 or more; etc. Among them, process oils such as paraffin oil and naphthene oil, and polyisobutylene resin (PIB) are preferable. One of them can be used alone, or two or more can be used together.

The weight average molecular weight Mw of the softener (b) is preferably 300 or more, more preferably 600 or more. The weight average molecular weight Mw of the softener (b) is preferably 1500 or less, more preferably 1400 or less. The weight average molecular weight Mw of the softener (b) not less than the lower limit suppresses stickiness and gives favorable feeling in use, and the weight average molecular weight Mw not more than the upper limit makes the molding processability favorable.

The kinetic viscosity (40° C.) of the softener (b) is preferably 50 mm$^2$/s or more, more preferably 80 mm$^2$/s or more. The kinematic viscosity of the softener (b) is preferably 400 mm$^2$/s or less, more preferably 390 mm$^2$/s or less. The kinematic viscosity of the softener (b) not less than the lower limit provides high flexibility and makes the property of fitting immediately after wearing or at a standstill/at rest and the property of tightening during exercise favorable, and the kinematic viscosity not more than the upper limit makes the molding processability favorable. The kinematic viscosity can be measured in accordance with HS K 2283, for example.

The softener (b) is not particularly limited in terms of manufacturing thereof and can be manufactured by a conventionally known method, for example. Typical commercial products of the softener (b) comprise, for example, the Diana Process Oil PW series (paraffin oil) manufactured by Idemitsu Kosan Co., Ltd., the Diana Process Oil NR series (Naphthene oil) manufactured by Idemitsu Kosan Co., Ltd. and the NOBEL process oil AB series (aromatic oil) manufactured by NIKKO OIL PRODUCTS.

The content of the softener (b) is preferably 10 to 400 parts by mass, more preferably 20 to 350 parts by mass, and further preferably 30 to 300 parts by mass, particularly preferably 35 to 250 parts by mass, relative to 100 parts by mass of the block copolymer (a). The content of the softener (b) not more than the upper limit provides high flexibility and makes the property of fitting immediately after wearing or at a standstill/at rest and the property of tightening during exercise favorable. The content of the softener (b) not less than the lower limit suppresses stickiness and gives favorable feeling in use.

<Other Components>

In an embodiment of the present invention, the thermoplastic elastomer composition (A) may contain an olefin resin (c). Preferable examples of the olefin resin (c) comprise a propylene polymer, an ethylene polymer, and a mixture thereof for the purpose of improving strength, molding processability, chemical resistance, heat resistance, and non-adhesiveness.

The content of the olefin resin (c) in the thermoplastic elastomer composition (A) is preferably 0 to 20 parts by mass relative to 100 parts by mass of the block copolymer (a). If the thermoplastic elastomer composition (A) contains the olefin resin (c), the content is preferably 0.1 to 20 parts by mass, more preferably 1 to 15 parts by mass, further preferably 2 to 10 parts by mass, further optimally 3 to 8 parts by mass relative to 100 parts by mass of the block copolymer (a).

Examples of the propylene polymer comprise homopolypropylene and copolymers of other α-olefins and propylene (e.g., random copolymers, block copolymers). The stereoregularity is not particularly limited, and the propylene polymer may be atactic polypropylene, syndiotactic polypropylene, atactic polypropylene. etc. Among them, copolymers of other α-olefins and propylene (e.g., random copolymers and block copolymers) are preferable. Examples of other α-olefins comprise ethylene and α-olefins having the carbon number of 4 to 20, for example, ethylene, 1-butene, 1-pentene, 1-hexene, 1-octene, and 4-methyl-1-pentene. Two or more other α-olefins can be used together.

Examples of the ethylene polymer comprise ethylene homopolymers such as low-density polyethylene (LDPE), medium-density polyethylene, and high-density polyethylene (HDPE); and copolymers of other α-olefins and ethylene (e.g., random copolymers and block copolymers). Examples of other α-olefins comprise α-olefins having the carbon number of 3 to 20, for example, propylene, 1-butene, 1-pentene, 1-hexene, 1-octene, and 4-methyl-1-pentene. Two or more other α-olefins can be used together. Specific examples comprise ethylene/α-olefin copolymers such as ethylene/1-butene copolymer, ethylene/1-hexene copolymer, ethylene/1-heptene copolymer, ethylene/1-octene copolymer, ethylene/4-methyl-1-pentene copolymer, ethylene/1-nonene copolymer, and ethylene/1-decene copolymer.

Furthermore, to enhance compatibility between the block copolymer (a) and the olefin resin (c), an active group-containing olefin resin obtained by copolymerization (random copolymerization, graft copolymerization) of a monomer having an active group such as a hydroxy group, a carbonyl group, an amide group, and/or an ester group with the olefin resin (c) may be used. An active group-containing block copolymer obtained by copolymerization of a monomer having the active group with the block copolymer (a) may be used.

The MFR of the olefin resin (c) is usually 1 to 700 g/10 minutes, preferably 10 to 500 g/10 minutes, and more preferably 20 to 300 g/10 minutes. The MFR within the range makes the molding processability favorable. The MFR can be measured in conformity to JIS K 7210 (230° C., 2.16 kg load).

The olefin resin (c) is not particularly limited in terms of manufacturing thereof and can be manufactured by a conventionally known method, for example. Typical commercial products of the olefin resin (c) comprise, for example, the Prime Polypro series Ltd., the HI-ZEX series, the NEO-ZEX series, and the ULTZEX series manufactured by Prime Polymer Co. Ltd.

The thermoplastic elastomer composition (A) may contain an organic or inorganic additive. Examples of the organic or inorganic additive comprise scaly inorganic additives such as clay, diatomaceous earth, silica, talc, barium sulfate, calcium carbonate, magnesium carbonate, metal oxides, mica, graphite and aluminum hydroxide. Additionally, the thermoplastic elastomer composition (A) may contain, as the organic or inorganic additive, various metal powders, wood chips, glass powders, ceramic powders, granular or powdered solid fillers such as granular or powdered polymers, various other natural or artificial short and long fibers (e.g., straw, hair, glass fibers, metal fibers, other various polymer fibers), etc.

From the viewpoint of weight reduction, the thermoplastic elastomer composition (A) may contain, as the organic or inorganic additive, a hollow filler, for example, an inorganic hollow filler such as glass balloons and silica balloons, and an organic hollow filler made of polyvinylidene fluoride, polyvinylidene fluoride copolymer, etc.

The thermoplastic elastomer composition (A) preferably contains, as the organic or inorganic additive, polyvinyl short fibers, polyarylate short fibers, graphite, mica, titanium oxide, aluminum powder, and/or carbon black, and in this case, an effect of significantly improving a damping property is produced.

The content of the organic or inorganic additive as described above is preferably less than 50 mass %, more preferably 0 to 40 mass %, further preferably 1 to 30 mass %, yet further preferably 3 to 20 mass %, particularly preferably 5 to 10 mass % relative to the thermoplastic elastomer composition (A). In an embodiment, the thermoplastic elastomer composition (A) contains no organic or inorganic additive.

The thermoplastic elastomer composition (A) may contain, in addition to the components described above, various antiblocking agents, heat stabilizers, antioxidants, light stabilizers, ultraviolet light absorbers, lubricants, crystal nucleating agents, foaming agents, colorants, flame retardants, etc. depending on application. Example of the antioxidants comprise phenolic antioxidants, phosphite antioxidants, and thioether antioxidants such as 2,6-di-tert-butyl-p-cresol, 2,6-di-tert-butylphenol, 2,4-dimethyl-6-tert-butylphenol, 4,4'-dihydroxydiphenyl, tris(2-methyl-4-hydroxy-5-tert-butylphenyl)butane, tetrakis[methylene-3-(3,5-di-tert-butyl-4-hydroxyphenyl)propionate]methane, and 3,9-bis{2-[3-(3-tert-butyl-4-hydroxy-5-methylphenyl)propionyloxy]-1,1-dimethylethyl}-2,4,8,10-tetraoxaspiro-5,5-undecane.

Among them, phenolic antioxidants and phosphite antioxidants are particularly preferred. The content of the antioxidant is preferably 0.01 to 3.0 mass %, more preferably 0.05 to 2.0 mass %, relative to the total amount of the thermoplastic elastomer composition (A), or specifically, relative to the components (a) to (c).

When the thermoplastic elastomer composition (A) contains a foaming agent, a sound deadening property and impact resistance can be imparted. A foaming method is not particularly limited and may be a chemical foaming or physical foaming method, and examples thereof comprise addition of an inorganic foaming agent, an organic foaming agent, thermally expandable fine particles, etc., critical foaming of carbon dioxide etc., or hollow glass balloons etc.

For a method of manufacturing the thermoplastic elastomer composition (A), a method used for manufacturing a general resin composition or manufacturing a rubber composition is usable; the thermoplastic elastomer composition (A) can be manufactured by uniformly compounding (melting and kneading) the components by using a melt kneader (a processing machine) such as a single-screw extruder, a twin-screw extruder, a mixing roll, a Banbury mixer, a heating roll, a pressurizing kneader, and various kneaders; and the obtained thermoplastic elastomer composition (A) can be pelletized. A set temperature of the processing machine can arbitrarily be selected from, for example, 150° C. to 300° C. depending on a type of resin, and the manufacturing method has no limitation. The obtained pellet-shaped thermoplastic elastomer composition (A) can be formed into a sheet by using, for example, a hot press roll, a hot press machine, an injection molding machine, an insert injection machine, a sheet molding machine, a coextrusion sheet molding machine, an extrusion lamination molding machine, or a calender roll molding machine. To obtain a multilayer sheet, a coextrusion sheet molding machine, an extrusion lamination molding machine, a wet laminator, etc. may be used. In another method, after dissolving the pellet-shaped thermoplastic elastomer composition (A) in a solvent such as toluene, the solution may be applied and dried on a heated casting roll or a release film.

A melt-kneaded material obtained as described above can be used for manufacturing a porous sheet, preferably, having a mesh shape, by using a known method. Examples of such a method comprise a method of extruding a melt-kneaded material on a roll having unevenness, a method of punching a melt-kneaded material extruded into a sheet shape, a method of forming a melt-kneaded material extruded in a fiber-like manner into a net-like shape or a knit-fabric shape, etc. Examples of the method of obtaining a sheet by a punching method comprise a method in which a film or a sheet of the resin composition is prepared for obtaining a mesh-shaped porous sheet by various punching methods, and a method in which a woven or non-woven fabric made of the resin composition is used for obtaining a mesh-shaped porous sheet by various punching methods. Among them, a sheet obtained by a punching method is optimum for achieving the purpose of the present invention.

To more easily and accurately making multiple pores in a post-process performed after sheet molding, it is preferable to dispose a release paper or a release film on at least one side of the obtained sheet, and it is more preferable to laminate the sheet on the release paper or release film at the time of sheet molding.

Although not particularly limited, examples of the release paper and the release film comprise PET or paper coated with various release agents such as a fluorine release agent and a silicon release agent.

A method of forming slits and/or pores in the sheet is not particularly limited. For example, when the thermoplastic elastomer composition (A) is melted and formed into a film, a molten sheet can be extruded and laminated on the release paper or the release film through an emboss cooling roll engraved with a predetermined shape so as to obtain a porous sheet having slits and/or pores with a predetermined shape. Alternatively, slits and/or pores of a predetermined shape can be formed by using a laser perforating machine, a mechanical perforating machine, etc. in a sheet extruded and laminated on the release paper or the release film so as to obtain a porous sheet. In another usable method, a porous sheet is obtained by using a laser plotter, a cutting plotter, a laser cutter, etc. capable of accurately controlling a direction of slits, a shape of pores, and a density of slits and/or pores by computer control, and this method is preferable from the viewpoint of accuracy of shapes etc. of the slits and pores.

<Porous Composite>

Another embodiment of the present invention provides a porous composite comprising a base fabric (B) and the porous sheet disposed on the base fabric (B). In the porous composite, the porous sheet may be disposed on one surface of the base fabric (B), or the porous sheets may be disposed on both surfaces of the base fabric (B). When the porous sheets are disposed on both sides of the base fabric (B), the porosity, the anisotropy, and the stretching stress relaxation rate may be the same or different between the two porous sheets.

<Base Fabric (B)>

Although not particularly limited, the base fabric (B) is a sheet-shaped fibrous base material. Examples thereof comprise a woven fabric, a non-woven fabric, a woven cloth, and a composite fabric composed of natural fibers, artificial fibers, synthetic fibers, and/or paper material etc. From the viewpoint of user comfort, the base fabric (B) preferably has flexibility. The fiber diameter is not particularly limited and is 1 to 1,000 dtex, for example.

The thickness of the base fabric (B) is, for example, about 0.1 to 3 mm, preferably about 0.2 to 2.0 mm, depending on application etc. of the porous composite.

The basis weight of the base fabric (B) is preferably 10 to 1,000 g/m$^2$, more preferably 10 to 1,000 g/m$^2$, from the viewpoint of flexibility, depending on application etc. of the porous composite.

Although not particularly limited, a method of manufacturing the porous composite may be a method of direct thermal fusion bonding of the porous sheet and the base fabric (B). Specifically, a method of laminating the porous sheet on the base fabric (B) and fusing and bonding the porous sheet and the base fabric (B) by using an iron, an electrothermal iron, or a curved surface heating press machine, etc. can be used. In this case, the fusion bond is preferably performed at a temperature as low as possible from the viewpoint of minimization of shape deformation and closure of the slits and/or pores. Alternatively, after laminating a sheet made of the thermoplastic elastomer composition (A) to the base fabric (B), slits and/or pores may be formed in both the sheet made of the thermoplastic elastomer composition (A) and the base fabric (B).

In the porous composite, a low temperature adhesive layer may be comprised between the porous sheet and the base fabric (B). The presence of the low temperature adhesive layer enables bonding of the porous sheet and the base fabric (B) at a low temperature (e.g., 10 to 40° C.), so that the shape deformation and closure of the slits and/or pores can be minimized, which facilitates satisfying both the properties of fitting, preventing tightening, and providing comfort immediately after wearing or at a standstill/at rest and the properties of tightening, fixation stability, and providing comfort during exercise. Examples of a component constituting the low temperature adhesive layer comprise an acrylic double-sided tape without a base material (base fabric) (manufactured by Nitto Denko Corporation: model number HJ-9150W). The low temperature adhesive layer may have a sheet shape, a non-woven fabric shape, or a mesh shape and may not entirely cover the contact portion between the porous sheet and the base fabric (B).

A method of bonding the porous sheet and the base fabric (B) by using an adhesive can also be used as the method of manufacturing the porous composite. Although not particularly limited, examples of the adhesive comprise acrylate, epoxy, and urethane adhesives. The adhesive may be disposed entirely or partially in the contact portion between the porous sheet and the base fabric (B). Before forming the slits and/or pores of the sheet made of the thermoplastic elastomer composition (A), the sheet and the base fabric (B) may be bonded via the adhesive, or after the bonding, the slits and/or pores may be formed in both the sheet made of the thermoplastic elastomer composition (A) and the base fabric (B).

The porous composite may comprise a functional layer. The functional layer is disposed on an outermost layer of the porous composite, for example. The functional layer is a layer improving slip properties, antifouling properties, deodorizing properties, antibacterial properties, and grip properties, for example. The functional layer may have a plurality of slits and/or pores. For example, a functional layer (E) is made of a fluorine, acrylic, silicon, or EVOH (ethylene-vinyl alcohol copolymer) polymer.

In the porous composite, at least one of the surfaces of the base fabric (B) and/or at least one of the surfaces of the porous sheet may be subjected to corona treatment or plasma treatment. By performing the corona treatment or the plasma treatment on the surfaces adjacent to each other of the base fabric (B) and the porous sheet, the adhesion between the base fabric (B) and the porous sheet can be enhanced. Examples of the plasma treatment comprise oxygen plasma treatment, atmospheric-pressure argon plasma treatment, and atmospheric-pressure nitrogen plasma treatment. Among them, the atmospheric-pressure plasma treatment is preferable.

The porous composite may comprise a primer layer between the base fabric (B) and the porous sheet. The primer layer can be disposed by drying a primer agent applied to a surface of the base fabric (B) or the porous sheet. Although not particularly limited, the primer layer may be obtained by combining, reacting, and drying polyol such as aliphatic cyclic structure-containing polyol, aromatic structure-containing polyester polyol, and hydrophilic group-containing polyol, and polyisocyanate such as aliphatic cyclic structure-containing polyisocyanate. The thickness of the primer layer is, for example, 1 to 10 μm, preferably 1 to 5 μm, from the viewpoint of the flexibility of the porous composite.

The porous composite can have a layer made of a resin composition laminated on at least one surface. The resin composition may be a composition exhibiting an elastomeric property. The layer made of the resin composition is not particularly limited in terms of shape, may be a layer having a uniform thickness on one side, and may have a linear shape or a dot shape. The thickness of the layer made of the resin composition is 10 μm to 1,000 mm, for example.

The porous composite may have an adhesive layer. The adhesive layer is preferably disposed on an outermost layer of the porous composite. The adhesive layer preferably has slits and/or pores from the viewpoint of the property of providing comfort immediately after wearing or at a standstill and at rest such as during walking as well as during exercise. If the porous composite has the adhesive layer on the outermost layer, the porous composite can be affixed to the body or clothing.

The porous composite may comprise a plurality of porous sheets. The plurality of porous sheets can be laminated via the adhesive. If the porous composite comprises the plurality of porous sheets, the porous sheets may have the same or different opening shapes, and locally desirable anisotropy and elastic recovery properties can be obtained by adjusting the area of the laminated porous sheets and/or the orientation of the porous sheets.

The porous sheet and the porous composite can satisfy both the properties of fitting, preventing tightening, and providing comfort immediately after wearing or at a standstill/at rest, and the properties of tightening, fixation stability, and providing comfort during exercise and therefore usable as a material for clothing, health products, medical supplies, sporting goods (particularly sporting clothes), and women's underwear.

EXAMPLES

The present invention will hereinafter more specifically be described with examples; however, the present invention is not limited thereto in any way. Unless otherwise specified, "%" and "parts" in the examples mean mass % and parts by mass.

(1) Weight Average Molecular Weight Mw and Low Polymerization Degree Ratio

The weight average molecular weight Mw was calculated in terms of standard polystyrene by using gel permeation chromatography (GPC) under the following conditions.

GPC: LC Solution (manufactured by SHIMADZU)
Detector: Differential Refractometer RID-10A (manufactured by SHIMADZU)
Column: Two TSKgel G4000Hxl in series (manufactured by TOSOH)
Guard column: TSK guard column Hxl-L (manufactured by TOSOH)
Solvent: tetrahydrofuran
Temperature: 40° C.
Flow rate: 1 ml/minute
Concentration: 2 mg/ml Based on the measurement, a ratio (low polymerization degree ratio) of a fraction having a weight average molecular weight of 200,000 or less was calculated on the basis of the whole of the block copolymer (a).

(2) Contents of 1,2-Bond and 3,4-Bond Units (Vinyl Bond Content)

The block copolymer (a) was dissolved in $CDCl_3$ and $^1$H-NMR measurement was performed (apparatus: JNM-Lambda 500 (manufactured by JEOL Ltd., measurement temperature: 50° C.). The vinyl bond content (the sum of the contents of 1,2-bond units and 3,4-bond units) was calculated from a ratio of a total peak area of structural units derived from isoprene, structural units derived from butadiene, or structural units derived from a mixture of isoprene and butadiene, and a peak area corresponding to the 1,2-bond and 3,4-bond units in structural units of isoprene, the 1,2-bond and 3,4-bond units in structural units of butadiene, or the respective bond units in the case of a mixture of isoprene and butadiene.

(3) Styrene Content

The styrene content was calculated from the weight of the monomer components used for polymerization.

(4) Porosity

The direction $D_{max}$ was defined as a direction in which the stretching stress of the porous sheet at the elongation of 10% is maximized among all the directions of the porous sheet and the direction $D_{min}$ was defined as a direction perpendicular to the direction $D_{max}$. A 10 cm×10 cm porous sheet was stretched in each of both directions $D_{max}$ and $D_{min}$ (longitudinal and lateral directions) by 1 cm (equivalent to 10% stretching) and copied to A4 size at the magnification of 400% by using a copier (IPSio0 SP6310 RPCS type manufactured by Ricoh Co., Ltd.) to obtain a copy sheet on which the porous sheet was printed; a weight (W1 [g]) of the copy sheet was measured after removal of the portion other than the outline (outer periphery) of the porous sheet; all the portions corresponding to opening portions of the copy sheet were then cut out to measure a weight (W2 [g]) of the copy paper after the cutting-out; and the porosity (%) was calculated according to the following equation. A sample was prepared by randomly cutting out 10 pieces from a porous sheet, and an average value of 10 measurements was used as the porosity of the sample:

Porosity (%)=$[(W1-W2)/W1] \times 100$.

(5) Anisotropy

When the direction $D_{max}$ was defined as a direction in which the stretching stress at the elongation of 100% is maximized among all the directions of the porous sheet and the direction $D_{min}$ was defined as a direction perpendicular to the direction $D_{max}$, $S_{Dmax100\%}$ was defined as the stretching stress of the porous sheet at the elongation of 100% in the direction $D_{max}$ and $S_{Dmin100\%}$ was defined as the stretching stress of the porous sheet at the elongation of 100% in the direction $D_{min}$.

From the porous sheet, 10 strip-shaped samples (samples $D_{max}$) of 7 cm (in the direction $D_{max}$)×2.5 cm (in the direction $D_{min}$) and 10 strip-shaped samples (samples $D_{min}$) of 2.5 cm (in the direction $D_{max}$)×7 cm (in the direction $D_{min}$) were randomly cut out. Subsequently, tensile strength measurement was performed by using Shimadzu Autograph (model number: AG-1, 500N) at a chuck interval=50 mm, a tension rate=100 min/minute, and a measurement temperature=23° C. to measure the stretching stress at the elongation of 100%. The tensile direction was the direction $D_{max}$ in the case of the samples $D_{max}$ and the direction $D_{min}$ in the case of the samples $D_{min}$. For the samples $D_{max}$ and the samples $D_{min}$, the stretching stresses at the elongation of 100% calculated by using the samples $D_{max}$ and the samples $D_{min}$ were denoted by $S_{Dmax100\%}$ and $S_{Dmin100\%}$, respectively, to calculate the anisotropy in accordance with the following equation, and an average value of 10 measurements was used as the anisotropy of each of the samples.

Anisotropy (%)=$[(S_{Dmax100\%}-S_{Dmin100\%})/S_{Dmax100\%}] \times 100$ (6) Stretching Stress Relaxation Rate The direction $D_{max}$ was defined as a direction in which the stretching stress of the porous sheet at the elongation of 500% is maximized among all the directions of the porous sheet and the direction $D_{min}$ was defined as a direction perpendicular to the direction $D_{max}$.

From the porous sheet, 10 strip-shaped samples (samples $D_{max}$) of 7 cm (in the direction $D_{max}$)×2.5 cm (in the direction $D_{min}$) were randomly cut out to prepare samples.

Subsequently, tensile strength measurement was performed by using Shimadzu Autograph (model number: AG-1, 500N) at a chuck interval=50 mm, a tension rate=100 mm/minute, and a measurement temperature=23° C. The stretching stress ($S_{Dmax500\%\cdot 0\ seconds}$) immediately after being stretched at the elongation of 500% in the direction $D_{max}$ and the stretching stress ($S_{Dmax500\%\cdot 60\ seconds}$) after being held for 60 seconds at the elongation of 500% were measured. This measurement was performed by using each of the samples to calculate the stretching stress relaxation rate (%) in accordance with the following equation, and an average value was used as the stretching stress relaxation rate of the sample:

Stretching stress relaxation rate (%)= $[(S_{Dmax500\%\cdot 0\ seconds}-S_{Dmax500\%\cdot 60\ seconds})/S_{Dmax500\%\cdot 0\ seconds}] \times 100$.

(7) Molding Processability

The molding processability at the time of manufacturing of pellets made of the resin composition (A) was evaluated. Regarding evaluation criteria, the molding processability was evaluated as "poor" if the die discharge of the resin composition (A) in a molten state from an extruder is unstable, or a sheet obtained by melting and forming pellets made of the resin composition (A) into a film has an appearance defect occurring on a surface such as thickness unevenness and/or flow unevenness, and was evaluated as "good" in the other cases.

<Resin Composition (A)>

The following components were used for preparing the resin composition (A) in examples and comparative examples.

<Block Copolymer (a)>

In accordance with Japanese Patent No. 2703335 or Japanese Laid-Open Patent Publication No. 2003-128870, a block copolymer having a structure of A-B-A was obtained, in a pressure-resistant reactor dried and subjected to replacement by nitrogen gas, by using cyclohexane as a solvent, n-butyllithium as an initiator, and tetrahydrofuran (THF) as a cocatalyst and by adding and polymerizing a styrene monomer, an isoprene monomer, and a styrene monomer in this order. Subsequently, the obtained block copolymer was subjected to a hydrogenation reaction in cyclohexane at a hydrogen pressure of 20 kg/cm$^2$ by using Pd—C as a catalyst. The following block copolymers (a-1) to (a-4) were manufactured by appropriately changing an addition amount of the cocatalyst and an addition ratio and an addition rate of the monomers.

Block Copolymer (a-1)

type: styrene-isoprene/butadiene-styrene triblock copolymer; weight average molecular weight Mw: 270,000; vinyl bond content: 8 mol %; styrene content: 30 mol %

Block Copolymer (a-2)

type: styrene-isoprene/butadiene-styrene triblock copolymer; weight average molecular weight Mw: 170,000; vinyl bond content: 8 mol %; styrene content: 32 mol %

Block Copolymer (a-3)

type: styrene-isoprene/butadiene-styrene triblock copolymer; weight average molecular weight Mw: 90,000; vinyl bond content: 8 mol %; styrene content: 30 mol %

Block Copolymer (a-4)

type: styrene-isoprene-styrene triblock copolymer; weight average molecular weight Mw: 270,000; vinyl bond content: 73 mol %; styrene content: 20 mol %

<Softener (b)>

Component (b-1)

Diana Process Oil PW-380 (trade name), manufactured by Idemitsu Kosan Co., Ltd.; paraffin oil; dynamic viscosity (40° C.): 381.6 mm$^2$/s; ring analysis paraffin: 73%; ring analysis naphthene: 27%; weight average molecular weight: 1304

<Olefin Polymer (c)>

Component (c-1)

Polypropylene, Prime Polypro J108M (trade name), manufactured by Prime Polymer Co. Ltd.; MFR (230° C., 2.16 kg load): 45 g/10 minutes Example 1

By using a twin-screw extruder (diameter: 46 mm, L/D=46), the pellet-shaped resin composition (A) was manufactured by melting and kneading constituent components described in Table 1 below at 190° C. in accordance with proportions shown in Table 1.

Subsequently, the obtained pellet-shaped resin composition (A) is put into an extrusion lamination molding machine (T-die type single-layer extrusion lamination film forming machine, diameter: 40 mm, L/D=24), and the resin composition (A) was extruded at an extrusion temperature of 240° C. to form a 500 µm sheet. To one surface of the sheet, a water-resistant double-sided adhesive sheet without a base fabric (HJ-9150W manufactured by Nitto Denko Corporation) having a release paper affixed to one side was affixed. In the obtained sheet, a plurality of minute rhombuses were opened in accordance with specifications shown in FIG. 1 by using a carbon dioxide gas laser processing machine (EFL1300 type) manufactured by Els Engineering Co., Ltd., to obtain a porous sheet. The minute rhombuses were sized to 9±1 mm (in the direction $D_{max}$)×1.6±0.2 mm (in the direction $D_{min}$) with a pore spacing in the direction $D_{max}$ of 12±1 mm, a pore spacing in the direction $D_{min}$ of 9±1 mm, and an area of one pore of 27.1±1 mm$^2$.

Lastly, after peeling the release paper from the porous sheet, in sports inner training pants (leggings shape) based on a base fabric (manufactured by Asahi Kasei: Elaction Pro AP 5108, polyester: 86 mass %, polyurethane: 14 mass %, basis weight: 210 g/m$^2$, thickness: 0.3 mm), the rectangular [10 cm ($D_{max}$)×15 cm ($D_{min}$)] porous sheet was laminated such that the direction $D_{max}$ coincided with a circumferential direction of the calf; the rectangular [15 cm ($D_{max}$)×20 cm ($D_{min}$)] porous sheet was laminated such that the direction $D_{max}$ coincided with a circumferential direction of the back of the thigh; the rectangular [15 cm ($D_{max}$)×5 cm ($D_{min}$)] porous sheet was laminated such that the direction $D_{max}$ coincided with a circumferential direction of the front of the knee joint; and the rectangular [3 cm ($D_{max}$)×30 cm ($D_{min}$)] sheet was laminated such that the direction $D_{max}$ coincided with a circumferential direction of both sides of the knee joint. The porous sheet was laminated to the inner training pants by using a pressurizing laminator at normal temperature. As a result, a porous composite (1) was obtained. The measurement results of the porosity, the anisotropy, and the stretching stress relaxation rate in the portions are shown in Table 1.

Examples 2 and 3

Porous composites (2) and (3) were obtained as in Example 1. except that constituent components and combination ratios described in Table 1 were applied. The measurement results of the porosity, the anisotropy, and the stretching stress relaxation rate in the portions are shown in Table 1.

Comparative Example 1

A porous composite (1)' was obtained as in Example 1 except that the opening treatment was not performed. The measurement results of the porosity, the anisotropy, and the stretching stress relaxation rate are shown in Table 1.

Comparative Example 2

A porous composite (2)' was obtained as in Example 2 except that the minute rhombuses were sized to 9±1 mm (in the direction $D_{max}$)×3.2±0.2 mm (in the direction $D_{min}$) with a pore spacing in the direction $D_{max}$ of 12±1 mm, a pore spacing in the direction $D_{min}$ of 4.5±1 mm, and an area of one pore of 14.4±1 mm$^2$. The measurement results of the porosity, the anisotropy, and the stretching stress relaxation rate are shown in Table 1. The stretching stress relaxation rate was unmeasurable since breakage occurred at the start of the measurement.

Comparative Example 3

A porous composite (3)' was obtained as in Example 3 except that the minute rhombuses were sized to 9±1 mm (in the direction $D_{max}$)×1.6±0.2 mm (in the direction $D_{min}$) with a pore spacing in the direction $D_{max}$ of 40±1 mm, a pore spacing in the direction $D_{min}$ of 30±1 mm, and an area of one pore of 7.2±1 mm$^2$. The measurement results of the porosity, the anisotropy, and the stretching stress relaxation rate are shown in Table 1.

TABLE 1

|  |  |  | Examples 1 | Examples 2 | Examples 3 | Comparative Examples 1 | Comparative Examples 2 | Comparative Examples 3 |
|---|---|---|---|---|---|---|---|---|
| Thermoplastic elastomer composition (A) | Block copolymer (a) | (a-1) | 30 parts (17%) | — | — | 30 parts (17%) | — | — |
|  |  | (a-2) | — | 100 parts (27%) | — | — | 100 parts (27%) | — |
|  |  | (a-3) | 70 parts (39%) | — | 55 parts (41%) | 70 parts (39%) | — | 55 parts (41%) |
|  |  | (a-4) | — | — | 45 parts (33%) | — | — | 45 parts (33%) |
|  | Softener (b) | (b-1) | 80 parts (44%) | 250 parts (68%) | 35 parts (26%) | 80 parts (44%) | 250 parts (68%) | 35 parts (26%) |
|  | Other component | (c-1) | — | 18 parts (5%) | — | — | 18 parts (5%) | — |
|  | Total |  | 180 parts (100%) | 368 parts (100%) | 135 parts (100%) | 180 parts (100%) | 368 parts (100%) | 135 parts (100%) |
| Porosity |  |  | 27% | 27% | 27% | 0% | 60% | 2% |
| Anisotropy |  |  | 85% | 85% | 85% | 0% | 85% | 85% |
| Stretching stress relaxation rate |  |  | 22% | 35% | 11% | 20% | unmeasurable | 21% |
| Low polymerization degree ratio |  |  | 70% | 100% | 55% | 70% | 100% | 55% |

Ten female badminton players wore the fabricated porous composites (1) to (3) and (1)' to (3)' (sports inner training pants) and walked for 5 minutes in a gymnasium (room temperature: 20 to 23° C., humidity: 50 to 65%). The 10 players made sensory evaluations of the properties of fitting, preventing tightening, and providing comfort (preventing stuffiness) of the inner training pants during walking (at rest). An average value of the evaluations of the 10 players was used as the evaluation of wearability.

Subsequently, the 10 players played a 15-minute practice match. The 10 players made sensory evaluations of the properties of fixation stability, tightening, and providing comfort (preventing stuffiness) of the inner training pants during the match (during exercise). An average value of the evaluations of the 10 players was used as the evaluation of wearability. The results are shown in Table 2. In Comparative Example 2, since the sheet could not be molded and the molding processability was poor, the wearability could not be evaluated.

The sensory evaluations were made based on the following evaluation criteria.
Rank 1: good
Rank 2: relatively good
Rank 3: normal, somewhat uncomfortable
Rank 4: uncomfortable
Rank 5: uncomfortable, not want to use.

Examples 1 to 3 and Comparative Examples 1 to 3 were also evaluated on molding processability. The results are shown in Table 2.

TABLE 2

|  |  | Examples 1 | Examples 2 | Examples 3 | Comparative Examples 1 | Comparative Examples 2 | Comparative Examples 3 |
|---|---|---|---|---|---|---|---|
| During walking | Fitting | 1.4 | 1.2 | 1.3 | 3.5 | unmeasurable | 1.4 |
|  | Preventing tightening | 1.5 | 1.2 | 1.4 | 3.5 | unmeasurable | 1.4 |
|  | Providing comfort (preventing stuffiness) | 1.5 | 1.4 | 1.4 | 3.3 | unmeasurable | 3.0 |
| During exercise | Fixation stability | 1.7 | 1.8 | 1.1 | 1.8 | unmeasurable | 1.6 |
|  | Tightening | 1.5 | 1.8 | 1.1 | 1.4 | unmeasurable | 1.5 |
|  | Providing comfort (preventing stuffiness) | 1.5 | 1.5 | 1.4 | 3.9 | unmeasurable | 3.9 |
| Molding processability |  | good | good | good | good | poor | good |

Example 4

By using a twin-screw extruder (diameter: 46 mm, L/D=46), the pellet-shaped resin composition (A) was manufactured by melting and kneading constituent components described in Table 3 below at 190° C. in accordance with proportions shown in Table 3.

Subsequently, the obtained pellet-shaped resin composition (A) is put into an extrusion lamination molding machine (T-die type single-layer extrusion lamination film forming machine, diameter: 40 mm, L/D=24), and the resin composition (A) was extruded at an extrusion temperature of 240° C. to form a 500 μm sheet. To one surface of the sheet, a water-resistant double-sided adhesive sheet without a base fabric (HJ-9150W manufactured by Nitto Denko Corporation) having a release paper affixed to one side was affixed. In the obtained sheet, a plurality of minute rhombuses were opened in accordance with specifications shown in FIG. 2 by using a carbon dioxide gas laser processing machine (EFL1300 type) manufactured by Els Engineering Co., Ltd.

Lastly, after peeling the release paper of the sheet in which pores were opened, the sheet was laminated in a breast portion of a female sports bra based on a base fabric (manufactured by Asahi Kasci: Elaction Pro AP 5108, polyester: 86%, polyurethane: 14%, basis weight: 210 g/m², thickness: 0.3 mm) by a pressurizing laminator under normal temperature to obtain a porous composite (4). The measurement results of the porosity, the anisotropy, and the stretching stress relaxation rate of the porous sheet are shown in Table 3.

Example 5

A porous composite (5) was obtained as in Example 4 except that constituent components and combination ratios described in Table 3 were applied and that slits shown in FIG. 3 (black portions of FIG. 3 indicate slits or pores) were fabricated instead of fabrication of the minute rhombic pores shown in FIG. 2. The measurement results of the porosity, the anisotropy, and the stretching stress relaxation rate are shown in Table 3.

Examples 6 to 11

Porous composites (6) to (11) were obtained as in Example 4 except that constituent components and combination ratios described in Table 3 were applied. The measurement results of the porosity, the anisotropy, and the stretching stress relaxation rate are shown in Table 3.

Example 12

A porous composite (12) was obtained as in Example 4 except that constituent components and combination ratios described in Table 3 were applied and that a plurality of rectangles shown in FIG. 4 (black portions of FIG. 4 indicate slits or pores) were fabricated instead of fabrication of the minute rhombic pores shown in FIG. 2. The measurement results of the porosity, the anisotropy, and the stretching stress relaxation rate are shown in Table 3.

Example 13

A porous composite (13) was obtained as in Example 4 except that constituent components and combination ratios described in Table 3 were applied and that a mesh-shaped porous sheet with a plurality of circles shown in FIG. 5 (black portions of FIG. 5 indicate slits or pores) having different vertical and horizontal intervals {circles having a diameter of 7 mm, vertical circle-to-circle intervals (length between circle end portions) of 7 mm, and horizontal circle-to-circle intervals of 4 mm} were fabricated instead of fabrication of the minute rhombic pores shown in FIG. 2. The measurement results of the porosity, the anisotropy, and the stretching stress relaxation rate are shown in Table 3.

Comparative Example 4

A porous composite (4)' was obtained as in Example 4 except that constituent components and combination ratios described in Table 3 were applied and that no pore was fabricated. The measurement results of the porosity, the anisotropy, and the stretching stress relaxation rate are shown in Table 3.

Comparative Examples 5 to 10

Porous composites (5)' to (10)' were obtained as in Example 4 except that constituent components and combination ratios described in Table 3 were applied. The measurement results of the porosity, the anisotropy, and the stretching stress relaxation rate are shown in Table 3. In Comparative Example 7, breakage occurred at the start of measurement of the stretching stress relaxation rate, and in Comparative Example 8, the stretching stress relaxation rate was unmeasurable since molding was impossible.

TABLE 3

| | | | Examples | | | | | | | | | |
|---|---|---|---|---|---|---|---|---|---|---|---|---|
| | | | 4 | 5 | 6 | 7 | 8 | 9 | 10 | 11 | 12 | 13 |
| Thermo-plastic elastomer composition (A) | Block copolymer (a) | (a-1) | 30 parts (17%) | 30 parts (17%) | 30 parts (17%) | 30 parts (17%) | 45 parts (25%) | 30 parts (19%) | — | — | 30 parts (17%) | 30 parts (17%) |
| | | (a-2) | — | — | — | — | — | — | 100 parts (27%) | — | — | — |
| | | (a-3) | 70 parts (39%) | 70 parts (39%) | 70 parts (39%) | 70 parts (39%) | 55 parts (31%) | 70 parts (45%) | — | 55 parts (41%) | 70 parts (39%) | 70 parts (39%) |
| | | (a-4) | — | — | — | — | — | — | — | 45 parts (33%) | — | — |
| | Softener (b) | (b-1) | 80 parts (44%) | 80 parts (44%) | 80 parts (44%) | 80 parts (44%) | 80 parts (44%) | 55 parts (35%) | 250 parts (68%) | 35 parts (26%) | 80 parts (44%) | 80 parts (44%) |
| | Other component | (c-1) | — | — | — | — | — | — | 18 parts (5%) | — | — | — |
| | Total | | 180 parts (100%) | 180 parts (100%) | 180 parts (100%) | 180 parts (100%) | 180 parts (100%) | 155 parts (100%) | 368 parts (100%) | 135 parts (100%) | 180 parts (100%) | 180 parts (100%) |
| | Porosity | | 27% | 19% | 27% | 12% | 26% | 26% | 27% | 26% | 35% | 33% |
| | Anisotropy | | 85% | 20% | 18% | 85% | 85% | 85% | 85% | 85% | 85% | 75% |
| | Stretching stress relaxation rate | | 22% | 20% | 24% | 24% | 22% | 15% | 35% | 11% | 15% | 20% |
| | Low polymerization degree ratio | | 70% | 70% | 70% | 70% | 55% | 70% | 100% | 55% | 70% | 70% |

TABLE 3-continued

|  |  |  | Comparative Examples | | | | | | |
|---|---|---|---|---|---|---|---|---|---|
|  |  |  | 4 | 3 | 6 | 7 | 8 | 9 | 10 |
| Thermo-plastic elasto-mer com-position (A) | Block copolymer (a) | (a-1) | 30 parts (17%) | 30 parts (17%) | 30 parts (17%) | 30 parts (17%) | — | — | 100 parts (33%) |
|  |  | (a-2) | — | — | — | — | 100 parts (72%) | 100 parts (21%) | — |
|  |  | (a-3) | 70 parts (39%) | 70 parts (39%) | 70 parts (39%) | 70 parts (39%) | — | — | — |
|  |  | (a-4) | — | — | — | — | — | — | — |
|  | Softener (b) | (b-1) | 80 parts (44%) | 80 parts (44%) | 80 parts (44%) | 80 parts (44%) | 70 parts (14%) | 350 parts (75%) | 175 parts (57%) |
|  | Other component | (c-1) | — | — | — | — | 18 parts (13%) | 18 parts (4%) | 30 parts (10%) |
|  | Total |  | 180 parts (100%) | 180 parts (100%) | 180 parts (100%) | 180 parts (100%) | 138 parts (100%) | 468 parts (100%) | 305 parts (100%) |
|  | Porosity |  | 0% | 26% | 2% | 60% | 76% | 27% | 27% |
|  | Anisotropy |  | 0% | 2% | 85% | 85% | 85% | 85% | 85% |
|  | Stretching stress relaxation rate |  | 20% | 22% | 21% | un-measu-rable | un-measu-rable | 42% | 60% |
|  | Low polymeri-zation degree ratio |  | 70% | 70% | 70% | 70% | 100% | 100% | 0% |

Sports bras were respectively fabricated as follows by using the porous composites (4) to (11) and (4)' to (10)' fabricated in Examples 4 to 13 and Comparative Examples 4 to 10, respectively. A manufacturing method comprises opening pores in the porous composites having pores opened into a predetermined shape after Nitto Denko double-sided adhesive tapes HJ-9159W are affixed thereto and affixing the porous composites to Wacoal sports bras HTY057 with cup portions removed except an outermost layer. Ten female badminton players wore the fabricated sports bras and walked for 5 minutes in a gymnasium (room temperature: 20 to 23° C., humidity: 50 to 65%). The 10 players made sensory evaluations of the properties of fitting, preventing tightening, and providing comfort (preventing stuffiness) of the sports bras during walking (at rest). An average value of the evaluations of the 10 players was used as the evaluation of wearability.

Subsequently, the 10 players played a 15-minute practice match. The 10 players made sensory evaluations of the properties of fixation stability, tightening, and providing comfort (preventing stuffiness) of the sports bras during the match (during exercise). An average value of the evaluations of the 10 players was used as the evaluation of wearability. The results are shown in Table 4.

The sensory evaluations were made based on the following evaluation criteria.
Rank 1: good
Rank 2: relatively good
Rank 3: normal, somewhat uncomfortable
Rank 4: uncomfortable
Rank 5: uncomfortable, not want to use.

Examples 4 to 11 and Comparative Examples 4 to 10 were also evaluated on molding processability. The results are shown in Table 4. In Comparative Example 8, since the sheet could not be molded and the molding processability was poor, the wearability could not be evaluated.

TABLE 4

|  |  | Examples | | | | | | | | | | Comparative Examples | | | | | | |
|---|---|---|---|---|---|---|---|---|---|---|---|---|---|---|---|---|---|---|
|  |  | 4 | 5 | 6 | 7 | 8 | 9 | 10 | 11 | 12 | 13 | 4 | 5 | 6 | 7 | 8 | 9 | 10 |
| During walking | Fitting | 1.4 | 1.7 | 1.7 | 1.4 | 1.5 | 1.5 | 1.2 | 1.3 | 1.4 | 1.3 | 3.5 | 3.0 | 1.4 | 1.2 | unmeas-urable | 1.2 | 1.4 |
|  | Preventing tightening | 1.5 | 1.5 | 1.7 | 1.4 | 1.7 | 1.7 | 1.2 | 1.4 | 1.3 | 1.4 | 3.5 | 1.8 | 1.4 | 1.2 | unmeas-urable | 1.2 | 1.3 |
|  | Providing comfort (preventing stuffiness) | 1.5 | 1.8 | 1.8 | 1.8 | 1.5 | 1.5 | 1.4 | 1.4 | 1.5 | 1.4 | 3.3 | 1.8 | 3.6 | 1.5 | unmeas-urable | 1.4 | 1.4 |

TABLE 4-continued

| | | Examples | | | | | | | | | | Comparative Examples | | | | | | |
|---|---|---|---|---|---|---|---|---|---|---|---|---|---|---|---|---|---|---|
| | | 4 | 5 | 6 | 7 | 8 | 9 | 10 | 11 | 12 | 13 | 4 | 5 | 6 | 7 | 8 | 9 | 10 |
| During exercise | Fixation stability | 1.7 | 1.5 | 1.4 | 1.4 | 1.4 | 1.3 | 1.8 | 1.1 | 1.7 | 1.1 | 1.8 | 3.3 | 1.6 | 2.8 | unmeasurable | 2.3 | 2.6 |
| | Tightening | 1.5 | 1.1 | 1.2 | 1.3 | 1.3 | 1.8 | 1.8 | 1.1 | 1.6 | 1.1 | 1.4 | 2.8 | 3.5 | 3.0 | unmeasurable | 3.0 | 2.7 |
| | Providing comfort (preventing stuffiness) | 1.5 | 1.7 | 1.8 | 1.8 | 1.8 | 1.4 | 1.5 | 1.4 | 1.4 | 1.4 | 3.9 | 1.7 | 3.9 | 1.6 | unmeasurable | 1.5 | 1.5 |
| Molding processability | | good | good | good | good | good | good | good | good | good | good | good | good | good | good | poor | good | good |

As shown in Table 1, favorable results are obtained from Examples 1 to 11 according to the present invention in terms of the properties of fitting, preventing tightening, and providing comfort during walking and the properties of fixation stability, tightening, and providing comfort during exercise at the same time. Particularly, in Example 11, the properties of fixation stability, tightening, and providing comfort during exercise are further favorable. On the other hand, Comparative Examples 1 to 10 could not satisfy all of the properties of fitting, preventing tightening, and providing comfort during walking and the properties of fixation stability, tightening, and providing comfort during exercise.

INDUSTRIAL APPLICABILITY

The present invention provides favorable properties of fitting, preventing tightening, and providing comfort (preventing stuffiness) immediately after wearing or at a standstill/at rest, and at the same time, provides favorable properties of fixation stability, tightening, and providing comfort (preventing stuffiness) during exercise, and therefore usable for sporting goods, sporting clothes, women's underwear, medical supplies, etc.

Although the preferred embodiments of the present invention have been described above, various additions, modifications, or deletions are possible without departing from the spirit of the present invention, and such additions, modifications, or deletions also fall within the scope of the present invention.

The invention claimed is:

1. A porous sheet, comprising:
   a thermoplastic elastomer composition comprising a block copolymer and/or a hydrogenated product of the block copolymer, and 55 to 400 parts by mass of a hydrocarbon softener relative to 100 parts by mass of the block copolymer and/or the hydrogenated product,
   wherein the block copolymer is made up of a first polymer block composed of at least one vinyl aromatic compound and a second polymer block composed of at least one conjugated diene compound,
   a proportion of a fraction having a weight average molecular weight of not more than 200,000 is 50 to 70 mass % based on a total amount of the block copolymer and/or the hydrogenated product, and
   the porous sheet has a plurality of slits and/or pores, and has a porosity of 5 to 80%, an anisotropy of 10% or more, and a stretching stress relaxation rate of 40% or less after being stretched by 500% and held for 60 seconds.

2. The porous sheet according to claim 1, wherein the at least one vinyl aromatic compound is selected from the group consisting of styrene, α-methylstyrene, β-methylstyrene, o-methylstyrene, m-methylstyrene, p-methylstyrene, t-butylstyrene, 2,4-dimethylstyrene, 2,4,6-trimethylstyrene, monofluorostyrene, difluorostyrene, monochlorostyrene, dichlorostyrene, methoxystyrene, vinyl naphthalene, and vinyl anthracene, and the at least one conjugated diene compound is selected from the group consisting of butadiene, isoprene, 2,3-dimethyl-1,3-butadiene, 1,3-pentadiene, and 1,3-hexadiene.

3. The porous sheet according to claim 1, wherein the proportion of the fraction having a weight average molecular weight not more than 200,000 is 55 to 70 mass % based on the total amount of the block copolymer and/or the hydrogenated product.

4. The porous sheet according to claim 1, wherein the thermoplastic elastomer composition comprises 55 to 350 parts by mass of the hydrocarbon softener relative to 100 parts by mass of the block copolymer and/or the hydrogenated product.

5. The porous sheet according to claim 1, wherein the porosity is 5 to 50%.

6. The porous sheet according to claim 1, wherein the pore has a size of 0.5 to 100 mm².

7. The porous sheet according to claim 1, further comprising an organic or inorganic additive in an amount of from 0 to 40 mass % relative to a mass of the thermoplastic elastomer composition.

8. The porous sheet according to claim 4, wherein the thermoplastic elastomer composition comprises 2 to 10 parts by mass of an olefin resin relative to 100 parts by mass of the block copolymer and/or the hydrogenated product.

9. The porous sheet according to claim 1, wherein the porous sheet has a mesh shape.

10. A porous composite, comprising:
    a base fabric, and
    the porous sheet according to claim 1 disposed on the base fabric.

11. The porous sheet according to claim 1, wherein the hydrocarbon softener has an average molecular weight Mw of from 300 to 1500.

12. The porous sheet according to claim 1, wherein the hydrocarbon softener has an average molecular weight Mw of from 600 to 1400.

13. The porous sheet according to claim 1, wherein the hydrocarbon softener comprises at least one selected from the group consisting of paraffinic oil, naphthenic oil, aromatic oil, and liquid paraffin.

14. The porous sheet according to claim 1, wherein the hydrocarbon softener has a kinetic viscosity of from 50 mm²/s to 400 mm²/s at 40° C.

15. The porous sheet according to claim 1, wherein the hydrocarbon softener has a kinetic viscosity of from 80 mm²/s to 390 mm²/s at 40° C.

16. The porous sheet according to claim 1, which is free of ethylene homopolymers.

17. The porous sheet according to claim 1, wherein the at least one conjugated diene compound is selected from the group consisting of butadiene and isoprene, and the block copolymer comprises a block copolymer (a1) having a vinyl bond content of not less than 45 mol % and a block copolymer (a2) having a vinyl bond content of less than 45 mol % based on all structural units derived from isoprene and butadiene.

* * * * *